United States Patent [19]

Jeong

[11] Patent Number: 5,743,613
[45] Date of Patent: Apr. 28, 1998

[54] VIDEO PROJECTOR WITH INTERIOR ILLUMINATING MECHANISM

[75] Inventor: Eui Seon Jeong, Kyungki-do, Rep. of Korea

[73] Assignee: LG Electronics Inc., Seoul, Rep. of Korea

[21] Appl. No.: 764,628

[22] Filed: Dec. 11, 1996

[30] Foreign Application Priority Data

Dec. 15, 1995 [KR]  Rep. of Korea ............... 50646/1995

[51] Int. Cl.$^6$ .................................................. G03B 21/14
[52] U.S. Cl. ............................................................ 353/119
[58] Field of Search ............................. 353/71, 119, 122

[56] References Cited

U.S. PATENT DOCUMENTS 3,885,868  5/1975  Hadzimihalis ..................... 353/71
5,347,324  9/1994  Sasaki et al. .
5,461,437  10/1995  Tanaka et al. ..................... 353/71
5,517,264  5/1996  Sutton ................................ 353/71

FOREIGN PATENT DOCUMENTS 0450829  2/1992  Japan ................................. 353/57

*Primary Examiner*—William Dowling

[57] ABSTRACT

A video projector includes a video cassette recorder (VCR), a light source for generating light for displaying image on a screen, a reflector for reflecting the light from the light source to generate a reflected light and for scattering the light from the light source to generate a dispersed light, an LCD display panel for receiving the reflected light and generating an image light to a screen through a first window, and a second window being selectively opened and closed for outputting the dispersed light from the reflector as an illumination source, wherein the first window is disposed on the same side of the video projector as the VCR operational panel of the VCR.

19 Claims, 1 Drawing Sheet

VIDEO PROJECTOR WITH INTERIOR ILLUMINATING MECHANISM

BACKGROUND OF THE INVENTION

1. Field of the Invention

The present invention relates to a projector which magnifies a visual signal externally supplied there to and displays the visual signal on a large-sized screen, and in particular, to a novel and useful projector which has a function of an interior illumination by using a dispersed light among the light projected from a light source for displaying on the screen as an exterior illumination through light which passes a projecting window selectively opened.

2. Description of the Prior Art

Conventionally, a generally used projector has a cassette entrance for receiving a cassette, a video cassette recorder (VCR) operating panel having a variety of operating keys mounted at a lower part thereof, and a main body casing mounted at the upper part thereof. The main body casing contains a light source, a reflection mirror, a parallel light lens, a liquid crystal display panel (LCD) and a focusing lens group arranged in parallel.

Therefore, the projector allows most of the conventional light for image processing to be projected into the reflection light from the light source onto the parallel light lens, which converts the light into a parallel. The converted parallel light is projected to the LCD panel for displaying a picture image. The light projected from the LCD panel is condensed on a corresponding screen through the focusing lens group, and thereby, the externally supplied visual signal is magnified and displayed on a large screen.

Through the course of projecting the light, part of the light for an image processing which is scattered by the upper and lower edges of the reflection mirror is not projected onto the parallel light lens, but is reflected against the body casing of the projector to be dispersed. The dispersed light is bound inside the body casing so that the dispersed light is not transmitted to the outside of the projector.

However, the above-described projector is accompanied by the following difficulties.

As an interior illuminating apparatus (e.g., lamp) is turned off to use the projector and a visual signal inputted through the VCR is displayed on a screen, the user may need to operate the operating keys (for example, a play key), a stop key, a rewinding key and a fast forward key and may need a writing tool or a pointer for taking notes. At which time, the interior illuminating apparatus has to be turned back on or an additional illuminating apparatus is necessary to provide interior light, causing a trouble or delay the process of operating and enjoying the projector.

SUMMARY OF THE INVENTION

Accordingly, it is an object of the present invention to provide a novel and useful projector which can achieve a function of an interior illumination by installing a projecting window at a portion of a body casing of a projector and by using a dispersed light not utilized for a display on a screen as an exterior illumination light output through the opening/closing of the projecting window.

To achieve the above and other objects, there is provided a novel and useful projector with a function of an interior illumination, having an open/close projecting window through which a dispersed light is output from.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 1A and 1B show a construction of a projector having a function of interior illumination according to the embodiment of the present invention, wherein FIG. 1A is a perspective view showing the schematic construction thereof, and FIG. 1B is a cross-sectional view showing an example of an inner construction of a main portion of a body casing of the projector in FIG. 1A.

DETAILED DESCRIPTION OF THE PREFERRED EMBODIMENTS

With reference to the accompanying drawings, the video projector with a function of an interior illumination will be described in detail.

Figure 1A:
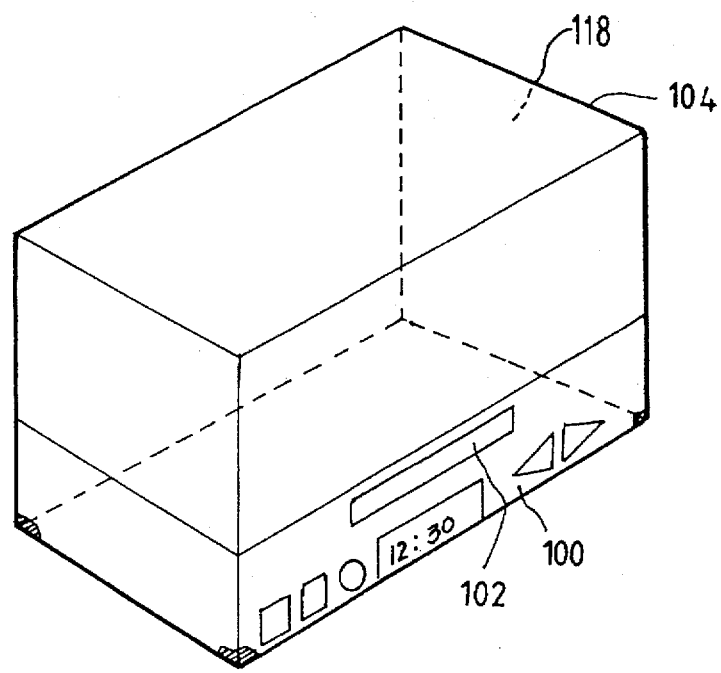
Figure 1B:
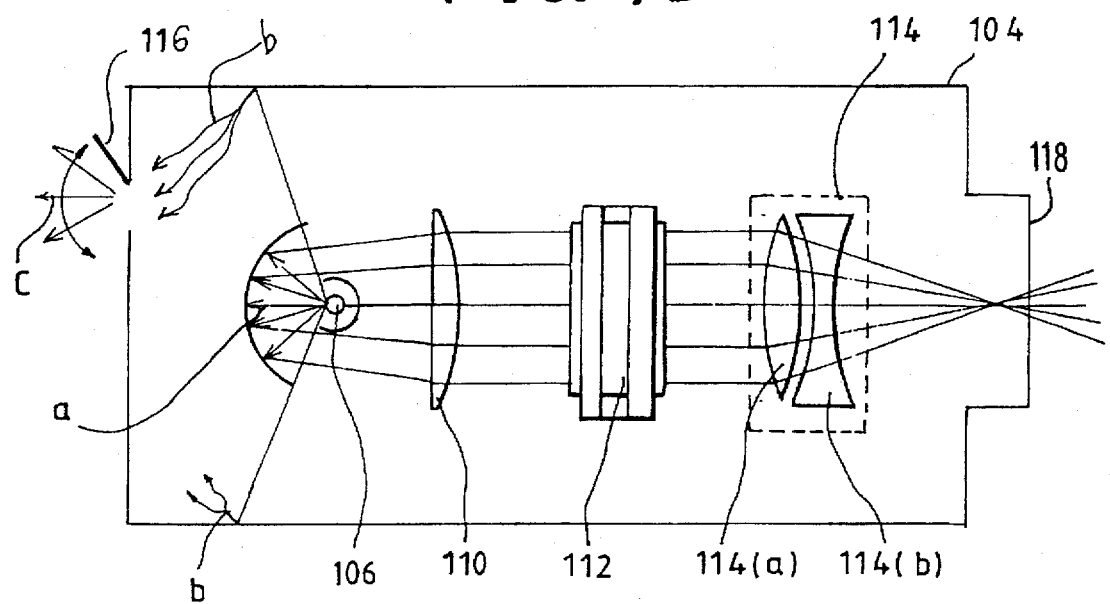

FIG. 1A is a perspective view showing a schematic construction of the video projector having a function of interior illumination. As shown in this drawing, the video projector according to the embodiments of the present invention includes a cassette entrance 102 disposed on a side of the projector, a VCR operating panel 100 having a variety of VCR operating keys (for example, a play key, a stop key, a rewinding key, a fast forward key) mounted in the same way as in the conventional, and a body casing 104 having elements are shown in FIG. 1B. The elements include a projecting window for emanating dispersed light, a light source, a reflection mirror, a parallel light lens, an LCD panel, and a focusing lens group.

The construction of each element installed in the body casing 104 of the projector is as follows:

At a portion of the body casing 104, a projecting window 116 for dispersed light is formed so that it can be opened and closed selectively. The body casing 104 includes, a light source 106 for emitting a light is disposed, a reflection mirror 108 disposed in front of the light source 206 for receiving the light projected from the light source 106 and reflecting the same, a parallel lens 110 disposed behind the light source 106 for receiving the light reflected from the reflecting mirror 108 and converting the received light into a parallel light, an LCD panel 112 disposed behind the parallel light lens 110 for receiving the light projected from the parallel light lens 110 and forming a picture image light, and a focusing lens group 114 having first and second lens groups 114(a) and 114(b) disposed in parallel with each other behind the LCD panel 112 for inverting the projected light from the LCD panel 112 passing through the control of the focusing distance of the first and second lens groups 114(a), 114(b), for outputting the focused image light through an outlet 118 to a screen and for controlling the luminosity of the image formed on the screen.

The projecting window 116 is formed at a back of the body casing 104 of the projector, as shown in FIG. 1B, or according to the user's preference, it can be installed at the side or upper portion of the body casing 104. However, it is preferred that the window 116 is disposed on the same side portion as the VCR operational panel 100 so that the light from the window 116 can be most effectively used to illuminate the VCR operational panel 100.

The operation of the projector according to the present invention will now be described when the user wants to display on a screen information/data recorded on a cassette tape by using the projector.

With the interior illuminating apparatus on to provide an interior light, a cassette is inserted through the cassette entrance 102. The illuminating apparatus is turned off after pushing the play key among the operating keys mounted on the VCR operating panel 100. A light for picture processing is projected toward the reflection mirror 108 through the light source 106. Most of the projected light(a) is projected towards the parallel light lens 110 and condensed onto the screen through the LCD panel 112 and the focusing lens group 114. Consequently the program recorded on the cassette taped is played back on the screen.

However, among the projected light(a), light (b) collides against the body casing 104 of the projector and is not projected to the parallel light lens 110 due to the collision against the upper/lower edges of the reflection mirror 108. Such light is projected to the outside through the opened projecting window 116 to function as an illuminating light (c). The projecting window 116 can be disposed, e.g., at the upper, side or back portion of the body casing 104 or the portion of the body casing 104 near the VCR operating panel 100. In FIG. 1B, the projecting window 116 for outputting the dispersed light is shown to be installed at the back of the body casing 104; however, it is preferred that the window 116 be disposed on the side portion of the video projector where the VCR operational panel is disposed.

When the illuminating light (c) is not unnecessary, the user can close the projected window so that the illuminating light (c) is not transmitted to the outside at all due to the body casing 104 which shut off light.

As described above, in case of the projector having the projecting window 116 for emanating the dispersed light, when the operation of the VCR operating panel 100 is needed while the user is appreciating the viewing of the program from the projector it is not necessary to turn back the interior illuminating apparatus or to provide an additional illuminating apparatus.

As described above, among the light projected from the light source for picture processing the dispersed light not employed in the display of the picture image is used as an illuminating light to the user outputting the dispersed light to the user to the outside of the projector through the opened projecting window. Therefore a highly reliable projector with added convenience in using the device is provided.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A video projector including a light source for generating light to display image on a screen, the video projector comprising:

reflection means for reflecting the light from the light source to generate a reflected light and for scattering the light from the light source to generate a dispersed light;

a liquid crystal display (LCD) panel for generating an image light by passing the reflected light therethrough;

a first window for outputting the image light to the screen; and a second window being selectively opened and closed to output the dispersed light from the reflection means as an illumination source.

2. The video projector of claim 1, further comprising:

a video cassette recorder (VCR) disposed in a housing to provide an image signal to the LCD panel; and a VCR operational panel to select an operation of the video projector.

3. The video projector of claim 2, wherein the second window is disposed on a same side of the video projector as the VCR operational panel.

4. The video projector of claim 3, further comprising:

a body casing containing therein the light source, the reflection means and the LCD panel, and having the first and second windows thereon.

5. The video projector of claim 4, wherein the second window is disposed on a side portion of the body casing.

6. The video projector of claim 1, further comprising:

a body casing including the reflection means, the light source, a parallel lens, the LCD panel, and a focusing lens group disposed in that order from the back of the video projector.

7. The video projector of claim 6, wherein the reflected light passes through the parallel lens and is converted into a parallel light, the parallel light passing through the LCD panel to generate the image light, the image light being focused by the focusing lens group and output to the screen through the first window.

8. The video projector of claim 6, wherein the dispersed light does not pass through the parallel lens.

9. The video projector of claim 2, wherein the VCR operational panel includes an insertion slot for inserting a tape, and a plurality of operational keys for selecting operations of the video projector.

10. The video projector of claim 9, wherein the second window is disposed near the VCR operational panel so that the dispersed light is provided to operate the operational keys of the VCR operational panel while the image light is output through the first window.

11. The video projector of claim 1, wherein the reflection means includes a mirror.

12. A method of providing a video projector having a light source for generating light to display image on a screen, a liquid crystal display (LCD) panel, and first and second windows, comprising the steps of:

reflecting the light from the light source and concurrently generating a reflected light and a scattered light;

passing the reflected light through the LCD panel to generate an image light;

outputting the image light to the screen through the first window; and selectively outputting the scattered light through the second window as an illumination source.

13. The method of claim 12, further comprising the steps of:

providing a video cassette recorder (VCR) in the video projector to provide an image signal to the LCD panel; and providing a VCR operational panel to select an operation of the video projector.

14. The method of claim 13, further comprising the step of:

disposing the second window on a same side of the video projector as the VCR operational panel.

15. The method of claim 14, further comprising the step of:

providing a body casing including a reflector used in the reflecting step, the light source, a parallel lens, the LCD panel, and a focusing lens group.

16. The method of claim 15, wherein the second window is disposed on a side portion of the body casing.

17. The method of claim 15, wherein the reflected light passes through the parallel lens and is converted into a parallel light, the parallel light passing through the LCD panel to generate the image light, the image light being focused by the focusing lens group and output to the screen through the first window.

18. The method of claim 13, wherein the second window is disposed near the VCR operational panel, so that the scattered light is provided to operate operational keys of the VCR operational panel while the image light is output through the first window.

19. The method of claim 15, wherein the scattered light does not pass through the parallel lens.

* * * * *